United States Patent
Breithaupt et al.

[11] Patent Number: 6,084,235
[45] Date of Patent: Jul. 4, 2000

[54] SELF ALIGNING COLOR WHEEL INDEX SIGNAL

[75] Inventors: William R. Breithaupt, Dallas; Joseph K. Masters, Wylie; Donald L. Hicks, The Colony, all of Tex.

[73] Assignee: Texas Instruments Incorporated, Dallas, Tex.

[21] Appl. No.: 09/085,973

[22] Filed: May 27, 1998

Related U.S. Application Data

[60] Provisional application No. 60/048,088, May 30, 1997.

[51] Int. Cl.[7] ...................................................... G02F 1/00
[52] U.S. Cl. ........................ 250/233; 250/226; 348/771; 348/743; 353/84; 345/32; 345/207
[58] Field of Search ............................. 353/84, 31, 121, 353/122; 348/743, 742, 760, 771, 764; 345/207, 31, 32; 250/226, 231.13, 231.17, 232, 233, 236

[56] References Cited

U.S. PATENT DOCUMENTS

| | | | |
|---|---|---|---|
| 5,079,544 | 1/1992 | DeMond et al. | 345/84 |
| 5,233,385 | 8/1993 | Sampsell | 355/35 |
| 5,365,283 | 11/1994 | Doherty et al. | 348/743 |
| 5,448,314 | 9/1995 | Heimbuch et al. | 348/755 |
| 5,452,024 | 9/1995 | Sampsell | 348/743 |
| 5,508,738 | 4/1996 | Janssen et al. | 348/196 |
| 5,526,051 | 6/1996 | Gove et al. | 348/388 |
| 5,612,736 | 3/1997 | Vogeley et al. | 348/207 |
| 5,625,424 | 4/1997 | Conner et al. | 348/743 |
| 5,691,780 | 11/1997 | Marshall et al. | 348/743 |
| 5,880,573 | 3/1999 | Marshall et al. | 318/805 |
| 5,967,636 | 10/1999 | Stark et al. | 353/84 |

*Primary Examiner*—John R. Lee
*Assistant Examiner*—Glenn T Kinnear
*Attorney, Agent, or Firm*—Charles A. Brill; Wade James Brady, III; Frederick J. Telecky, Jr.

[57] ABSTRACT

A method of generating a color wheel index signal for use in a display system (10) that uses a spatial light modulator (14) and a color wheel (15). The index signal is compared to a reference signal associated with an input image signal so that the color wheel and the data being displayed can be synchronized (FIG. 2). The index signal is generated by placing a color-sensitive photodetector (14a) in close proximity to the spatial light modulator (14). Light filtered through the color wheel (15) illuminates both the spatial light modulator (14) and the photodetector (14a). The photodetector (14a) responds to color transitions in the filtered light, generating a pulse in response to each transition to the color to which it is sensitive.

15 Claims, 1 Drawing Sheet

SELF ALIGNING COLOR WHEEL INDEX SIGNAL

This application claims priority under 35 U.S.C. §119(e)(1) of provisional application Ser. No. 60/048,088, filed on May 30, 1997.

TECHNICAL FIELD OF THE INVENTION

This invention relates to image display systems, and more particularly to digital image display systems that use a color wheel.

BACKGROUND OF THE INVENTION

Image display systems based on spatial light modulators (SLMs) are an alternative to image display systems based on cathode ray tubes (CRTs). SLM systems provide high resolution without the bulk of CRT systems.

Digital micro-mirror devices (DMDs) are one type of SLM, and may be used for either direct view or for projection displays. A DMD has an array of hundreds or thousands of tiny tilting mirrors, each of which provides light for one pixel of an image. To permit the mirrors to tilt, each mirror is attached to one or more hinges mounted on support posts, and spaced by means of a fluidic (air or liquid) gap over underlying control circuitry. The control circuitry provides electrostatic forces, which cause each mirror to selectively tilt. For display applications, image data is loaded to memory cells of the DMD and in accordance with this data, mirrors are tilted so as to either reflect light to, or deflect light from, the entrance pupil of a projection lens and then to an image plane.

One approach to providing color images in an SLM display system is referred to as "sequential color". All pixels of a frame of the image are sequentially addressed with different colors. For example, each pixel might have a red, a green, and a blue value. Then, during each frame period, the pixels of that frame are addressed with their red, green, then blue data, alternatingly. A color wheel having segments of these same colors is synchronized with the data so that as the data for each color is displayed by the SLM, the light incident on the SLM is filtered by the color wheel. For standard display rates, the eye perceives the image as having the proper color.

If the data being displayed and the color wheel are not property synchronized, visual artifacts will occur. One approach to synchronization is to generate an index signal that indicates the location of a designated point on the color wheel. Each time the color wheel completes one rotation, a new index signal is generated. The index signal can then be used to synchronize the color wheel to each new frame of data, such as by comparing it to a reference signal. An example of a reference signal is the vertical sync signal that accompanies a broadcast television signal. The reference signal and the index signal are delivered to a color wheel controller, which maintains the correct color wheel phase relationship with the source signal, as well as the correct rotation speed.

The use of an index signal to control the color wheel motor is described in U.S. Pat. No. 5,365,283, entitled "Color Phase Control for Projection Display Using Spatial Light Modulator", assigned to Texas Instruments Incorporated.

To generate the index signal, some existing systems use a reflective marker on the color wheel that reflects light to a photodetector. Others also use a marker on the color wheel, but one that is magnetic so that it can be detected with a hall sensor. These systems require separate sensor circuitry, special alignment procedures during manufacture, and proper maintenance of the alignment during continued use.

SUMMARY OF THE INVENTION

One aspect of the invention is a method of synchronizing a color wheel to image data being displayed by a spatial light modulator. The spatial light modulator is illuminated with light filtered through the color wheel. An index signal is generated by placing a color-sensitive photodetector in close proximity to the spatial light modulator, such that the same filtered light that illuminates the spatial light modulator also illuminates the photodetector. The photodetector detects transitions to section(s) of the color wheel that provide the color to which it is sensitive, and thereby provides an index pulse for each such transition. The index signal is comprised of these index pulses. Typically, one pulse per revolution is compared to the frame period of the incoming data. The frame period is known from a reference signal associated with the image data, such as the vertical sync signal. The results of the comparison are used to control the speed and phase of the color wheel.

An advantage of the invention is that it provides a self-aligning means for providing an index signal. In other words, because the photodetector is placed at the spatial light modulator, there is no need for a special alignment procedure as would be required for a detector that responds to a marker on the color wheel. The improved indexing of the color wheel to the data being displayed helps ensure the elimination of visual artifacts.

The self-aligning feature of the invention results in both lower manufacturing costs. There is no need for a separate photodetector unit with attendant wiring and mounting. Also, maintenance is easier for the end user. In sum, the display system is cheaper and more reliable.

DETAILED DESCRIPTION OF THE INVENTION

Display System Overview

The following description is in terms of a display system that displays images generated by an SLM or other pixel array display device. The term "pixel array display device" is used in a broad sense to include any type of array that generates a display using individually addressed pixels. In general, the invention could be used with any display system that uses a spatial light modulator illuminated by light filtered through a color wheel.

Figure 1:
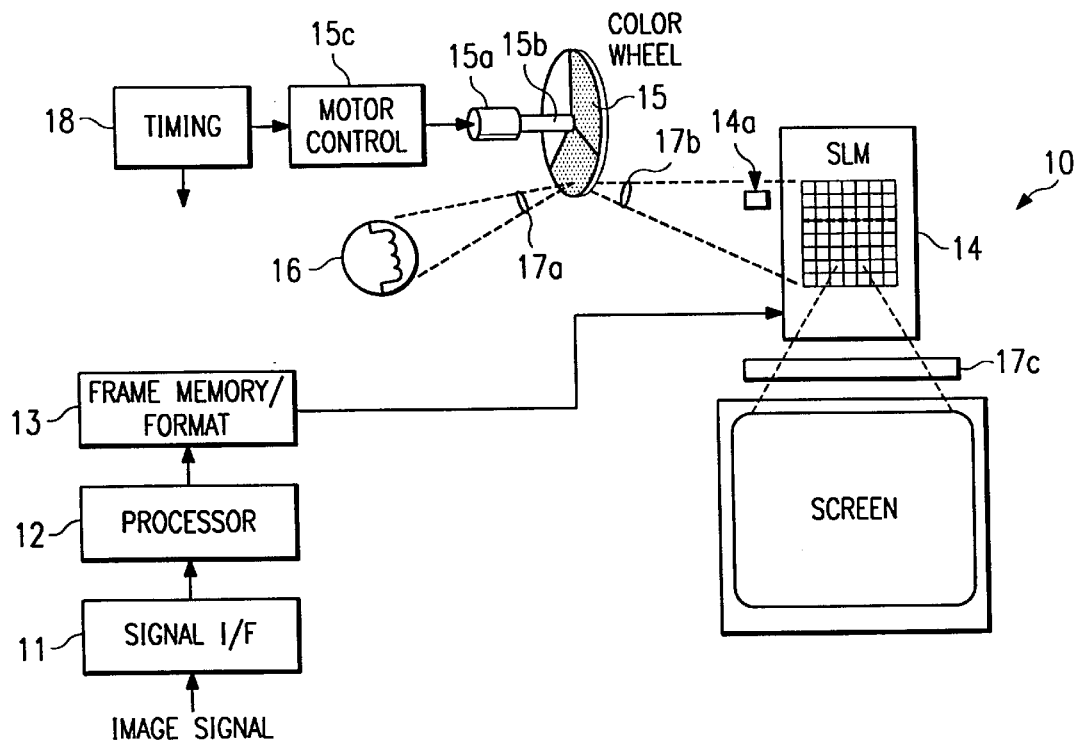
FIG. 1 is a block diagram of a display system having a photodetector for generating an index signal in accordance with the invention.

FIG. 1 is a block diagram of a typical SLM-based image display system 10 that uses a color wheel 15. The following overview of the various components of display system 10 provides details helpful to understanding of the invention. Further details pertaining to a DMD-based image display system with other types of color wheels are set out in U.S. Pat. No. 5,079,544, entitled "Standard Independent Digitized Video System"; In U.S. Pat. No. 5,526,051, entitled "Digital Television System"; and in U.S. Pat. No. 5,452,024, entitled "DMD Display System". Further details describing the general operation of color wheels for SLM-based display systems are set out in U.S. Pat. No. 5,233,385, entitled "White Light Enhanced Color Field Sequential Projection"; U.S. Pat. No. 5,448,314, entitled "Method and Apparatus for Sequential Color Imaging"; and U.S. Pat. No. 5,625,424, entitled "Digital Motor Controller for Color Wheel". Each of these patents and patent applications is assigned to Texas Instruments Incorporated, and each is incorporated herein by reference.

Signal interface 11 receives some kind of input signal. For purposes of example herein, it will be assumed that the input signal is a standard NTSC video signal having horizontal and vertical synchronization components. However, in other systems, the input signal might be graphics data already in digital form. The signal is "field sequential" in that the video information is arranged field-by-field, separated in accordance with the vertical sync signal.

In the case of a video input signal, interface 11 separates the video signal from synchronization and audio signals. It includes an A/D converter and a Y/C separator, which convert the data into pixel data samples and separate the luminance data from the chrominance data. The signal could be converted to digital data before Y/C conversion or Y/C separation could occur before digitization.

Pixel data processor 12 prepares the data for display, by performing various processing tasks. Processor 12 includes processing memory for storing pixel data during processing. The tasks performed by processor 12 may include linearization, colorspace conversion, and proscan. Linearization removes the effect of gamma correction, which is performed on broadcast signals to compensate for the non-linear operation of CRT displays. Colorspace conversion converts the data to RGB data. Proscan converts interlaced fields of data into frames by generating new data to fill in odd or even lines. The order in which these tasks are performed may vary.

Display memory 13 receives processed pixel data from processor 12. Display memory 13 formats the data, on input or on output, into "bit-plane" format and delivers the bit-planes to SLM 14. The bit-plane format provides one bit at a time for each pixel of SLM 14 and permits each pixel to be turned on or off in accordance with the weight of that bit. For example, where each pixel is represented by n bits for each of three colors, there will be 3 n bit-planes per frame. Bit-planes containing less significant bits will result in shorter display times than the bit-planes containing more significant bits. A pixel value of 0 (black) results in the pixel being off for that color during the frame. For each color, each mirror element of the SLM 14 can be "on" for a duration of anywhere from 1 LSB period to $2^n-1$ LSB periods. In other words, each color has $2^n-1$ time slices, during which any pixel can be on for any number of time slices between 0 and $2^n-1$.

In a typical display system 10, memory 13 is a double-buffer memory, which means that it has a capacity for at least two display frames. The buffer for one display frame can be read out to SLM 14 while the buffer for another display frame is being written. The two buffers are controlled in a "ping-pong" manner so that data is continuously available to SLM 14.

SLM 14 may be any type of SLM. For purposes of example, this description is in terms of a display system whose SLM 14 is a digital micro-mirror device (DMD). However, as stated above, the same concepts could apply to display systems that use other types of SLMs in combination with a color wheel 15.

Light incident on SLM 14 is provided by a light source 16 and is transmitted through a rotating color wheel 15. Optics 17a focusses the source illumination, in the form of a source beam of diminished diameter, to a "spot size" at the plane of the color wheel 15. Optics 17b increases the beam size to a diameter that will illuminate the pixel array of SLM 14.

A feature of the invention is that the size of the beam that illuminates SLM 14 is sufficient to also illuminate photodetector 14a. This photodetector 14a is placed at or near the perimeter of SLM 14. Photodetector 14a may be part of the integrated circuitry of SLM 14 or may comprise separate circuitry. In any event, typically, photodetector 14a is in a fixed position relative to SLM 14. As explained below in connection with FIG. 2, photodetector 14a is used to generate an index signal, which indicates the position of color wheel 15. The fixed positioning of photodetector (14a) and SLM 14, together with their function of receiving the same light from color wheel 15, is what avoids the need to align them to calibrate the index signal.

In the example of FIG. 1, color wheel 15 has three filter segments, each of a different primary color. For purposes of example herein, these colors are red, green, and blue. In alternative embodiments, other colors could be used and fewer or more than three colors could be used. Also, there could be more than one segment for each color. The segments need not be exactly the same size, depending on the desired color balance.

As explained in the Background, the data for each color are sequenced and the display of the data is synchronized so that the portion of color wheel 15 through which light is being transmitted to SLM 14 corresponds to the data being displayed. In the example of this description, each pixel is represented by RGB data, which means that each pixel has a red value, a green value, and a blue value. As the values for each color of all pixels in a frame are being displayed, color wheel 15 rotates so that the light is transmitted through the corresponding red, blue or green filter. For each pixel, the combination of these three values is perceived as the desired color. The array of pixels generates a color image.

Color wheel 15 is attached to a shaft 15b, which is driven by motor 15a, causing color wheel 15 to rotate. A motor control unit 15c controls the speed and phase of color wheel 15. Typically, where a frame of data is displayed for a frame period of T seconds, color wheel 15 has a period of revolution of T seconds. For example, the desired speed might be 60 revolutions per second to correspond to a 60 frame per second display rate. However, other timing schemes are possible, such as a color wheel that rotates at integer or fractional multiples of T.

When the color wheel 15 and the data being displayed are "in-phase", the proper filter (red, green, or blue) of color wheel 15 is transmitting light to SLM 14 as the data for that filter is being displayed. U.S. Pat. No. 5,365,283, entitled "Color Phase Control for Projection Display Using Spatial Light Modulator", assigned to Texas Instruments Incorporated and incorporated by reference herein, describes a method of using pointers to maintain the in-phase relationship between color wheel 15 and the displayed data. The term "synchronization" is used herein also to refer to the proper timing relationship between the color wheel 15 and the data being displayed.

Optics 17c projects the image formed by the pixel array of SLM 14 to a screen or other image plane. Master timing unit 18 provides various system control functions.

Synchronization of Color Wheel to Displayed Data

Figure 2:
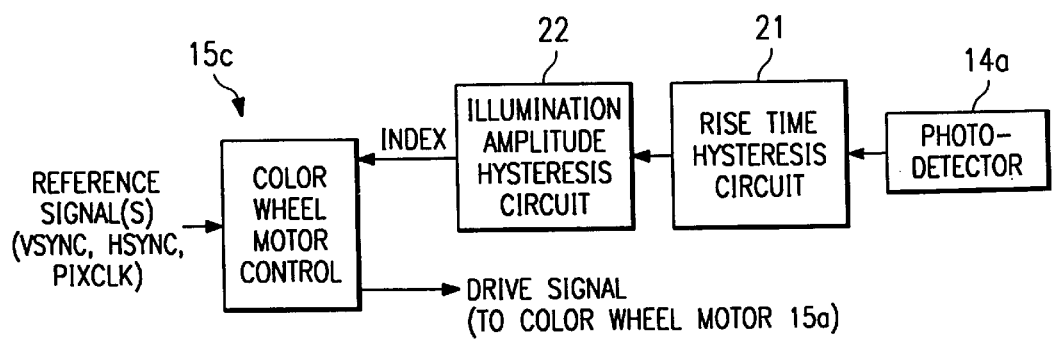
FIG. 2 illustrates the use of the index signal generated in accordance with the invention.

FIG. 2 illustrates motor control unit 15c in further detail. The basic operation of motor control unit 15c is to use various input timing signals to generate a drive signal for color wheel motor 15a. The input timing signals include a reference signal from the incoming data, such as the vertical sync signal (VSYNC) of a television broadcast signal, and an index signal (INDEX) from photodetector 14a.

U.S. Pat. No. 5,625,424, entitled "Digital Motor Controller for Color Wheel", incorporated by reference herein, describes one embodiment of motor control unit 15c. That description discusses the use of an index pulse, which could be an index pulse generated in accordance with the present invention.

Depending on the design of the motor control unit 15c, the reference signal may be derived from a signal other than, or in addition to, the VSYNC signal. For example, as stated above, U.S. Pat. No. 5,365,283, entitled "Color Phase Control for Projection Display Using Spatial Light Modulator", describes a method of using the horizontal sync signal as a reference. Also, U.S. Pat. No. 5,691,780, entitled "Phase Error Control for Color Wheel" describes a method of controlling phase errors when a channel is changed. Both of these documents are incorporated herein by reference and both are independent of the origin of the INDEX signal.

As stated above, in the example of this description, photodetector 14a is placed adjacent to the pixel array of SLM 14. The same color-filtered light that illuminates the SLM 14 also illuminates the photodetector 14a.

Photodetector 14a is sensitive to only one of the colors filtered through color wheel 15. Thus, in the example of this description, photodetector 14a is sensitive to red, green, or blue light.

Because photodetector 14a is sensitive to only one color, it generates a new "detect" signal each time the color wheel makes a transition to that color. This detect signal terminates at the transition to the next color. The result is a pulse whose leading or trailing edge occurs once per revolution of the color wheel 15. This pulse indicates the speed and position of the color wheel 15. The duration of the pulse is equal to the length of time during which that segment of the color wheel 15 is illuminating SLM 14. A series of pulses is the index signal (INDEX).

Motor control unit 15c uses the INDEX signal to ensure that the speed and phase of the color wheel are matched to the frame rate and color sequence of the data being displayed. The INDEX signal will have a constant timing relationship to the time when data of a certain color should be displayed. Any inherent delay between detection of the color transition and the data timing will be constant and predictable and can be calculated into the drive signal generation.

FIG. 2 also illustrates a hysteresis circuit 21, which can be used to compensate for slow rise times of the INDEX pulses. This slow rise time is primarily a function of the "spoke" transition time between section of the color wheel 15 and the sensitivity of photodetector 14a. For example, with a long spoke transition time and a sensitive photodetector 14a, the rise time could be as long as 150 μseconds. A suitable hysteresis circuit 21 could reduce this rise time to a rise time in the order of 10 μseconds.

A second type of hysteresis circuit 22 could be used to compensate for variance in the amplitude of the illumination source 16. Over time, it is possible that this amplitude could diminish. In this case, the hysteresis circuit 22 would ensure that the index pulse continues to be triggered at the same time relative to the position of the color wheel 15.

In the example of this description, a single photodetector 14a is used. Thus, an INDEX pulse is generated once per revolution of color wheel 15. In more complex embodiments, multiple photodetectors 14a could be used to re-synchronize each color.

The invention could be easily modified for color wheels having more than one section per color. For example, if a color wheel had two sections for each color, every other INDEX pulse could be used to indicate one color wheel revolution.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of providing an index signal, which is used to synchronize a color wheel to image data being displayed by a spatial light modulator, comprising the steps of:

placing a photodetector in close proximity to said spatial light modulator, such that the same illumination used to illuminate said spatial light modulator also illuminates said photodetector, said photodetector being sensitive to only one color of said color wheel;

detecting at least one transition between colors provided by said color wheel during each revolution of said color wheel, thereby providing a series of index pulses; and generating an index signal comprised of said index pulses in response to said detecting step.

2. The method of claim 1, wherein said placing step is performed by manufacturing said photodetector as part of an integrated circuit containing said spatial light modulator.

3. The method of claim 1, wherein said color wheel has one section per color, and wherein said detecting step is performed for a single transition per revolution of said color wheel.

4. The method of claim 1, wherein said color wheel has multiple sections per color, and further comprising the step of counting said pulses to determine each said revolution of said color wheel.

5. The method of claim 1, further comprising the step of compensating for the edge time of said pulses.

6. The method of claim 1, further comprising the step of compensating for variance in said illumination.

7. The method of claim 1, further comprising the step of repeating said placing, detecting, and generating with at least one additional photodetector for at least one additional color.

8. The method of claim 1, wherein said spatial light modulator is a digital micro-mirror device.

9. A method of synchronizing a color wheel to image data being displayed by a spatial light modulator, comprising the steps of:

placing a photodetector in close proximity to said spatial light modulator, such that the same illumination used to illuminate said spatial light modulator also illuminates said photodetector, said photodetector being sensitive to only one color of said color wheel;

detecting at least one transition between colors provided by said color wheel for each revolution of said color wheel, thereby providing a series of index pulses;

generating an index signal comprised of said index pulses in response to said detecting step;

comparing said index signal to a reference signal associated with said image data; and providing a color wheel control signal based on the results of said comparing step.

10. The method of claim 8, wherein said placing step is performed by manufacturing said photodetector as part of an integrated circuit containing said spatial light modulator.

11. The method of claim 8, wherein said color wheel has one section per color, and wherein said detecting step is performed for a single transition per revolution of said color wheel.

12. The method of claim 8, wherein said color wheel has multiple sections per color, and further comprising the step of counting said pulses to determine each said revolution of said color wheel.

13. The method of claim 8, further comprising the step of compensating for the edge time of said pulses.

14. The method of claim 8, further comprising the step of compensating for variance in said illumination.

15. The method of claim 8, further comprising the step of repeating said placing, detecting, and generating with at least one additional photodetector for at least one additional color.

* * * * *